Aug. 22, 1961     J. WORON     2,996,831

TOY COFFEE POT

Filed Jan. 25, 1961

INVENTOR

JOSEPH WORON

BY

ATTORNEY

2,996,831
TOY COFFEE POT
Joseph Woron, Cornwells Heights, Pa.
Filed Jan. 25, 1961, Ser. No. 84,824
5 Claims. (Cl. 46—14)

This invention relates to an animated toy and more particularly to one simulating a boiling beverage dispenser such as a coffee pot, tea pot, or the like.

One of the objects of the invention is to provide a simple and practical construction which readily lends itself to appropriate economical forms of manufacture, available to the toy industry, while, at the same time, providing a novel structural arrangement which a child may easily operate.

More specifically, a further object of the invention is to provide a unit to be embodied in a beverage dispenser which is self-contained in the respect that it may be readily manufactured as to all of its parts, assembled, and then fitted to the vessel itself. Thereafter, simple operations may be readily effected by a child to give the desired animated effect of boiling water.

With the above and other objects in view which will appear as the nature of the invention is better understood, the invention consists in the novel construction, combination and arrangement of parts, hereinafter more fully described, illustrated and claimed.

A preferred and practical embodiment of the invention is shown in the accompanying drawings, in which.

Similar reference characters designate corresponding parts throughout the several figures of the drawing.

Figure 1:
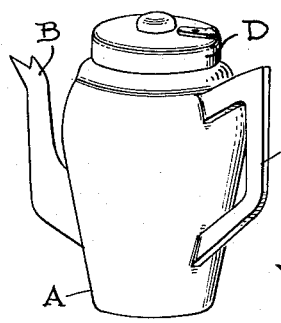
FIGURE 1 is a detail perspective view of a percolator embodying the invention.
Figure 2:
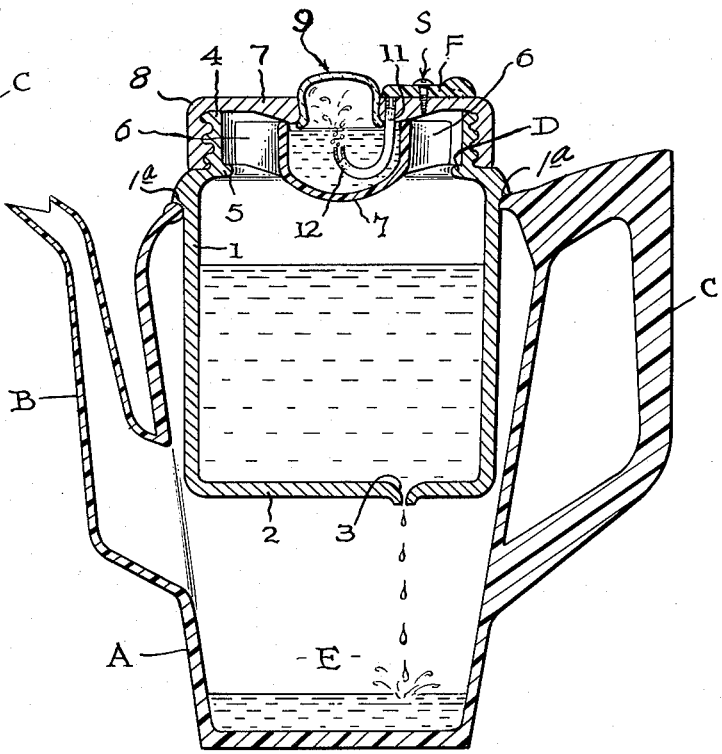
FIGURE 2 is a vertical cross-sectional view of a toy coffee pot embodying the invention.
Figure 4:
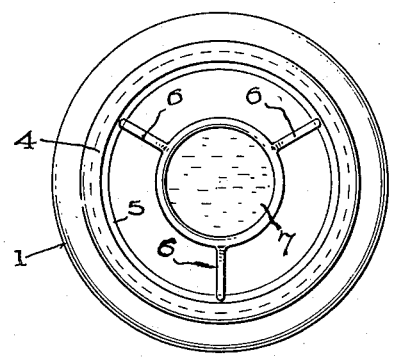
FIGURE 4 is a top plan view of the cup unit with the cover of FIGURES 1 and 2 removed.
Figure 3:
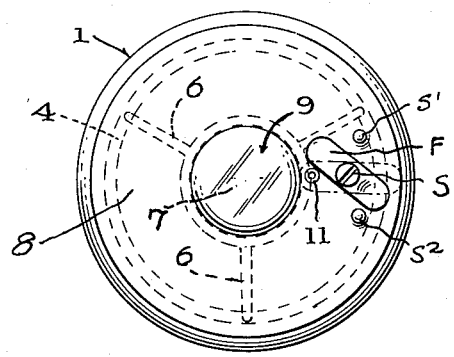
FIGURE 3 is a top plan view of the complete unit as observed from the side of the cover.

As shown in FIGURE 1, the simulated beverage dispenser is shown in the form of a coffee pot body including a body A having a hollow spout B and a handle C.

The top of the body A is provided with a suitable opening, preferably circular to removably receive the animation unit designated generally as D which is suspended above a pocket or sump E formed in the bottom of the body A and in communication with the spout.

The animated unit D includes a container 1 having a rib 1a to rest on the mouth of the opening in the body and also having a bottom wall 2 provided with a drip opening 3. The upper or mouth portion of the container 1 is provided with an externally threaded neck 4 and an internal bead 5 which supports the radially spaced arms 6 of a cup unit whose central portion is provided with a fluid holding chamber 7 intended to receive water to the approximate level shown by the dotted lines.

The cup unit 6, 7, is covered and sealed by the application of an internally screw-threaded cap 8, the said internal threads engaging with the external threads of the neck 4 of the container. The medial portion of the cap 8 is provided with a transparent dome 9 of any suitable material to overlie the chamber 7. The inner side of the cover carries a substantially J-shaped air tube 11—12 which has its upper open end 11 controlled by a valve F while its lower inner end is positioned below the level of the water line of the chamber 7.

Assuming that the parts are assembled as shown in FIGURE 1 and it is desired to place the device in operation, the cover 8 is removed from the container 1 and the body of the container as well as the chamber 7 are filled with water to appropriate levels as shown, at least so that the inner end 12 of the J-shaped tube is covered with water.

As long as the valve covers the upper air inlet end of the tube 11—12, the water in the cup chamber 7 will remain quiescent. However, as soon as the user turns the valve F to open the outer end of the tube 11—12 which is exposed to the atmosphere, the water in the bottom of the container will leak out through drip opening 3 into the sump E and create a vaccum in dome 9 above the body of the water in the container 1, since, as shown, the interior of the dome is open to the space above the water in the container because of the spider-like support for the cup forming chamber 7.

Inasmuch as the dome 9 over the chamber 7 of the cup unit is in communication with the space above the liquid in the chamber, the aforesaid vacuum will draw air through the tube 11—12 so that air at its submerged inner end will pass up through the water in the said chamber 7 and give the effect of water boiling, such for example, as it usually does in a coffee percolator.

When it is desired to stop the animated effect of boiling water, it is only necessary to swing the valve F covering the upper air inlet end of the tube 11—12.

The valve F is preferably in the form of a flat plate pivotally secured by a screw S to the top 7 and limited in its swinging movement by suitable studs $S^1$ and $S^2$.

I claim:

1. A toy simulating a boiling beverage pot, comprising, a body having a top opening, a handle and a spout in communication with the lower portion of the body, and an animation unit fitted in said top opening and including a container having a mouth portion, an external rib on the container detachably resting on the body at the location of the top opening for sealed engagement therewith, a bottom wall for the container having a fluid drip opening, a cap having sealing engagement with the container, a transparent dome on the cap, a cup unit supported in the mouth of the container below said dome and having a fluid holding chamber, an air tube having its inlet end exposed at the cap and its outlet end disposed below the fluid level of the chamber of the cup, and valve means for opening and closing the end of the air inlet tube exposed to the atmosphere.

2. A toy according to claim 1, wherein, the cap pivotally supports a valve for opening and closing the inlet end of said air tube.

3. A toy according to claim 1, wherein, the container has an internal bead in its mouth portion and the cup unit has radial arm portions adapted to engage said bead, said cup unit having a chamber disposed beneath said dome.

4. A toy according to claim 1, wherein, the air tube is of J-shape with its air intake end carried by the cap and its air outlet end located below the upper rim of the fluid chamber and substantially in line with the axis of the dome on the cap.

5. A toy percolator comprising in combination, a body having a spout leading to a fluid sump in the lower part of the body, a fluid container mounted in the upper portion of the body and having a drip hole discharging into said sump, a cap for the container having a transparent dome, means supported below the cap including a chamber for holding a fluid, and an air tube carried by the cap and having a valved intake end exposed to the atmosphere at the cap and its other end located below the fluid level of the fluid chamber, whereby, when fluid is in the container and the said chamber and the valved intake end of said air tube is open, fluid passing through the drip hole in the container and into the sump will produce a vacuum in the zone of the chamber to admit atmospheric pressure to the chamber to cause the fluid therein to bubble up into said dome.

References Cited in the file of this patent
UNITED STATES PATENTS 2,814,905    Notaro     Dec. 3, 1957
2,831,293    Gotz     Apr. 22, 1958